(12) United States Patent
Czeiger et al.

(10) Patent No.: US 6,683,883 B1
(45) Date of Patent: Jan. 27, 2004

(54) ISCSI-FCP GATEWAY

(75) Inventors: Moshe Czeiger, Haifa (IL); Yoav Flint, Haifa (IL)

(73) Assignee: Sancastle Technologies Ltd., Yokne'Am (IL)

( * ) Notice: Subject to any disclaimer, the term of this patent is extended or adjusted under 35 U.S.C. 154(b) by 60 days.

(21) Appl. No.: 10/119,804

(22) Filed: Apr. 9, 2002

(51) Int. Cl.[7] .................... H04L 12/28; H04L 12/56
(52) U.S. Cl. ................. 370/401; 370/466; 709/310
(58) Field of Search ............................. 370/401, 409, 370/466, 464, 465, 474, 503; 709/310, 326; 710/1, 3, 11

(56) References Cited

U.S. PATENT DOCUMENTS

| | | | | |
|---|---|---|---|---|
| 5,959,994 A | * | 9/1999 | Boggs et al. ................ | 370/399 |
| 2002/0118703 A1 | * | 8/2002 | O'Neill et al. ............... | 370/474 |
| 2003/0021239 A1 | * | 1/2003 | Mullendore et al. ........ | 370/276 |
| 2003/0031187 A1 | * | 2/2003 | Heffernan et al. .......... | 370/400 |
| 2003/0058870 A1 | * | 3/2003 | Mizrachi et al. ....... | 370/395.52 |
| 2003/0099254 A1 | * | 5/2003 | Richter ....................... | 370/466 |

\* cited by examiner

*Primary Examiner*—Wellington Chin
*Assistant Examiner*—Chirag Shah
(74) *Attorney, Agent, or Firm*—Abelman, Frayne & Schwab

(57) ABSTRACT

A method for transferring information between an iSCSI device operating under an iSCSI protocol within a TCP/IP network and a SCSI over Fiber Channel (FCP) device operating under an FCP protocol within an FC network, including:

coupling the TCP/IP and the FC networks via a gateway which conveys data between the networks;

generating in the gateway a virtual-FC-address for the iSCSI device;

generating in the gateway a virtual-TCP/IP-address for the FCP device;

conveying a first FC-data-frame, from the FCP device addressed to the virtual-FC-address of the iSCSI device;

translating in the gateway the first FCP-data-frame into a first iSCSI-data-frame, addressed to a TCP/IP address of the iSCSI device; and conveying the first iSCSI-data-frame from the gateway to the iSCSI device responsive to the TCP/IP address.

The gateway also transfers data from the iSCSI to the FCP device using the virtual addresses.

12 Claims, 4 Drawing Sheets

ISCSI-FCP GATEWAY

FIELD OF THE INVENTION

The present invention relates generally to data transfer, and specifically to data transfer between Internet Small Computer System Interface devices and devices operating in a Fibre Channel network.

BACKGROUND OF THE INVENTION

As requirements for the ability to transfer large amounts of data between computing entities has grown, demand for efficient transfer of the data within and between computing networks has also increased. An ubiquitous protocol used for transferring data is a Transmission Control Protocol/Internet Protocol (TCP/IP) TCP is described by Postel in Request For Comments (RFC) 793 of the U.S. Defence Advanced Research Projects Agency (DARPA), which is incorporated herein by reference.

A Small Computer System Interface (SCSI) protocol enables an input/output (I/O) device such as a printer or a scanner, termed a target, to communicate with a client of the I/O device, termed an initiator. The original SCSI was standardized in 1986 by the American National Standards Institute (ANSI) as X3.131-1986, and limited distances between the target and the initiator to relatively small values, of the order of six meters. The current evolving SCSI standard is described in a document titled "SCSI Architecture Model-2 (SAM-2)," produced by T10, Technical Committee of the National Committee on Information Technology Standards, which may be found on the T10 Internet site at ftp://ftp.t10.org/t10/drafts/sam2, and which is incorporated herein by reference.

An Internet SCSI (iSCSI) protocol has been developed by the Internet Engineering Task Force (IETF) to enable SCSI clients and I/O devices to communicate with no limitations on distance between the components. A draft of the protocol can be found at http://ietf.org/internet-drafts/draft-ietf-ips-iscsi-08.txt, and is incorporated herein by reference. The iSCSI protocol encapsulates SCSI commands by representing them as serial strings of bytes preceded by iSCSI headers. The strings of bytes with iSCSI headers, termed Protocol Data Units (PDUs), are formed into TCP/IP packets which are transmitted in a TCP/IP network.

A number of Fibre Channel (FC) protocols have been issued by the American National Standards Institute, Washington, D.C. A Fibre Channel protocol enables transfer of data-frames via an FC switching fabric controlled by a management facility. An FCP protocol is a mapping of the SCSI protocol into an FC protocol, and is a protocol that supports data transfer between hosts and SCSI I/O devices over FC networks.

Cisco Systems, Inc., of San Jose, Calif., produce an SN 5420 storage router which is able to convey SCSI commands from a host operating in a TCP/IP network to a storage device operating in an FC network. The host incorporates a dedicated SN 5420 driver to convert SCSI commands to iSCSI data and transfer the iSCSI data to the SN 5420 router.

SUMMARY OF THE INVENTION

It is an object of some aspects of the present invention to provide a method and apparatus for transferring data between an Internet Small Computer System Interface device and a Fibre Channel device.

In preferred embodiments of the present invention, a gateway couples a network operating under a Transmission Control Protocol/Internet Protocol (TCP/IP) with a network operating under a Fibre Channel (FC) protocol, so as to transfer data between the networks. At least one device in the TCP/IP network is implemented to operate according to an Internet Small Computer System Interface (iSCSI) protocol, such devices herein being termed iSCSI devices. The FC network comprises at least one FC device implemented to operate according to a SCSI protocol, such devices herein being termed FCP devices.

The gateway generates an FC "image" of each of the iSCSI devices, each FC image comprising a respective virtual FC address, preferably derived from an FC storage name server. Each iSCSI device is thus "visible" to the FCP devices in the FC network via its respective FC image, and communication between the iSCSI devices and the FCP devices can be implemented via the virtual FC addresses of the iSCSI devices. The gateway also generates a TCP/IP image of each of the FCP devices, each TCP/IP image being visible to the iSCSI devices in the TCP/IP network, and comprising a respective virtual TCP/IP address (preferably derived from an IP name server) with which the iSCSI devices can communicate. To implement communication between a specific iSCSI device and a specific FCP device, a "connection-pair" between the two devices is formed. The connection-pair comprises a first TCP connection between the iSCSI device and the gateway and a second FC connection between the FCP device and the gateway.

To transfer data between the two devices, the gateway translates data frames transmitted via the connection-pair between FC protocol data and iSCSI protocol data. Thus, the gateway enables iSCSI devices and FCP devices to communicate bi-directionally in a substantially transparent manner, without requiring software and/or hardware changes to existing iSCSI and FCP devices.

Preferably, the gateway performs a synchronization check on iSCSI frames received while a connection-pair is operative. Most preferably, in the event of discovering a synchronization error, the gateway resynchronizes remaining frames and allows missing frames to be recovered at an application level. Alternatively, the gateway closes the connection-pair, and allows the application to reopen it.

The gateway is most preferably implemented to translate between each iSCSI task that uses the TCP connection and a corresponding FCP task that uses the FC connection.

The gateway is most preferably also implemented to collect FCP data sequences, each of which might be comprised of several FC frames, and then send each sequence as an iSCSI data message. It is also implemented to translate each iSCSI data message into an FCP data sequence, breaking each sequence into one or more FC frames.

There is therefore provided, according to a preferred embodiment of the present invention, a method for transferring information between an Internet Small Computer System Interface (iSCSI) device operating under an iSCSI protocol within a Transmission Control Protocol/Internet Protocol (TCP/IP) network and a SCSI over Fibre Channel (FCP) device operating under an FCP protocol within a Fibre Channel (FC) network, including:

coupling the TCP/IP and the FC networks via a gateway adapted to convey data between the networks;

generating in the gateway a virtual-FC-address compatible with the FC protocol for the iSCSI device;

generating in the gateway a virtual-TCP/IP-address compatible with the TCP/IP protocol for the FCP device;

conveying a first FC-data-frame, compatible with the FCP protocol and comprising FCP-data, from the FCP device addressed to the virtual-FC-address of the iSCSI device;

translating in the gateway the first FCP-data-frame into a first iSCSI-data-frame, compatible with the iSCSI protocol and comprising the FCP-data, addressed to a TCP/IP address of the iSCSI device;

conveying the first iSCSI-data-frame from the gateway to the iSCSI device responsive to the TCP/IP address;

conveying a second iSCSI-data-frame, compatible with the iSCSI protocol and comprising iSCSI-data, from the iSCSI device addressed to the virtual-TCP/IP-address of the FCP device;

translating in the gateway the second iSCSI-data-frame into a second FCP-data-frame, compatible with the FCP protocol and comprising the iSCSI-data, addressed to an FC address of the FCP device; and conveying the second FCP-data-frame from the gateway to the FCP device responsive to the FC address.

Preferably, the FCP-data includes a task for the iSCSI device, and translating the first FCP-data-frame includes mapping the task to an iSCSI task; and the iSCSI-data includes a task for the FCP device, and translating the second iSCSI-data-frame includes mapping the task to an FC task.

Preferably, translating in the gateway the second iSCSI-data-frame includes performing a synchronization check on the second iSCSI-data-frame.

The method preferably further includes resynchronizing a subsequent iSCSI-data-frame responsive to the synchronization check.

The method preferably includes generating a connection-pair between the iSCSI device and the FCP device, wherein the connection-pair includes a TCP connection between the iSCSI device and the gateway which is mapped to an FC connection between the gateway and the FCP device.

There is further provided, according to a preferred embodiment of the present invention, apparatus for transferring information between an Internet Small Computer System Interface (iSCSI) device operating under an iSCSI protocol within a Transmission Control Protocol/Internet Protocol (TCP/IP) network and a SCSI over Fibre Channel (FCP) device operating under an FCP protocol within a Fibre Channel FC network, including:

a gateway, including a central processing unit (CPU) and a memory, wherein the gateway couples the TCP/IP and the FC networks and is adapted to convey data between the networks, wherein the CPU:

generates in the memory a virtual-FC-address compatible with the FC protocol for the iSCSI device; and generates in the memory a virtual-TCP/IP-address compatible with the TCP/IP protocol for the FCP device; and wherein the gateway is adapted to:

receive a first FCP-data-frame, compatible with the FCP protocol and comprising FCP-data, from the FCP device addressed to the virtual-FC-address of the iSCSI device;

translate the first FCP-data-frame into a first iSCSI-data-frame, compatible with the iSCSI protocol and comprising the FCP-data, addressed to a TCP/IP address of the iSCSI device;

convey the first iSCSI-data-frame from the gateway to the iSCSI device responsive to the TCP/IP address;

receive a second iSCSI-data-frame, compatible with the iSCSI protocol and comprising iSCSI-data, from the iSCSI device addressed to the virtual-TCP/IP-address of the FCP device;

translate the second iSCSI-data-frame into a second FCP-data-frame, compatible with the FCP protocol and comprising the iSCSI-data, addressed to an FC address of the FCP device; and convey the second FCP-data-frame from the gateway to the FCP device responsive to the FC address.

Preferably, the FCP-data includes a task for the iSCSI device, and the CPU maps the task to an iSCSI task.

Further preferably, the iSCSI-data includes a task for the FCP device, and the gateway maps the task to an FCP task.

Preferably, the gateway is adapted to perform a synchronization check on the second iSCSI-data-frame.

Further preferably, the gateway is adapted to resynchronize a subsequent iSCSI-data-frame responsive to the synchronization check.

Preferably, the CPU is adapted to generate a connection-pair between the iSCSI device and the FCP device, wherein the connection-pair includes a TCP connection between the iSCSI device and the gateway which is mapped to an FC connection between the gateway and the FCP device.

The present invention will be more fully understood from the following detailed description of the preferred embodiments thereof, taken together with the drawings, in which:

DETAILED DESCRIPTION OF PREFERRED EMBODIMENTS

Figure 1:
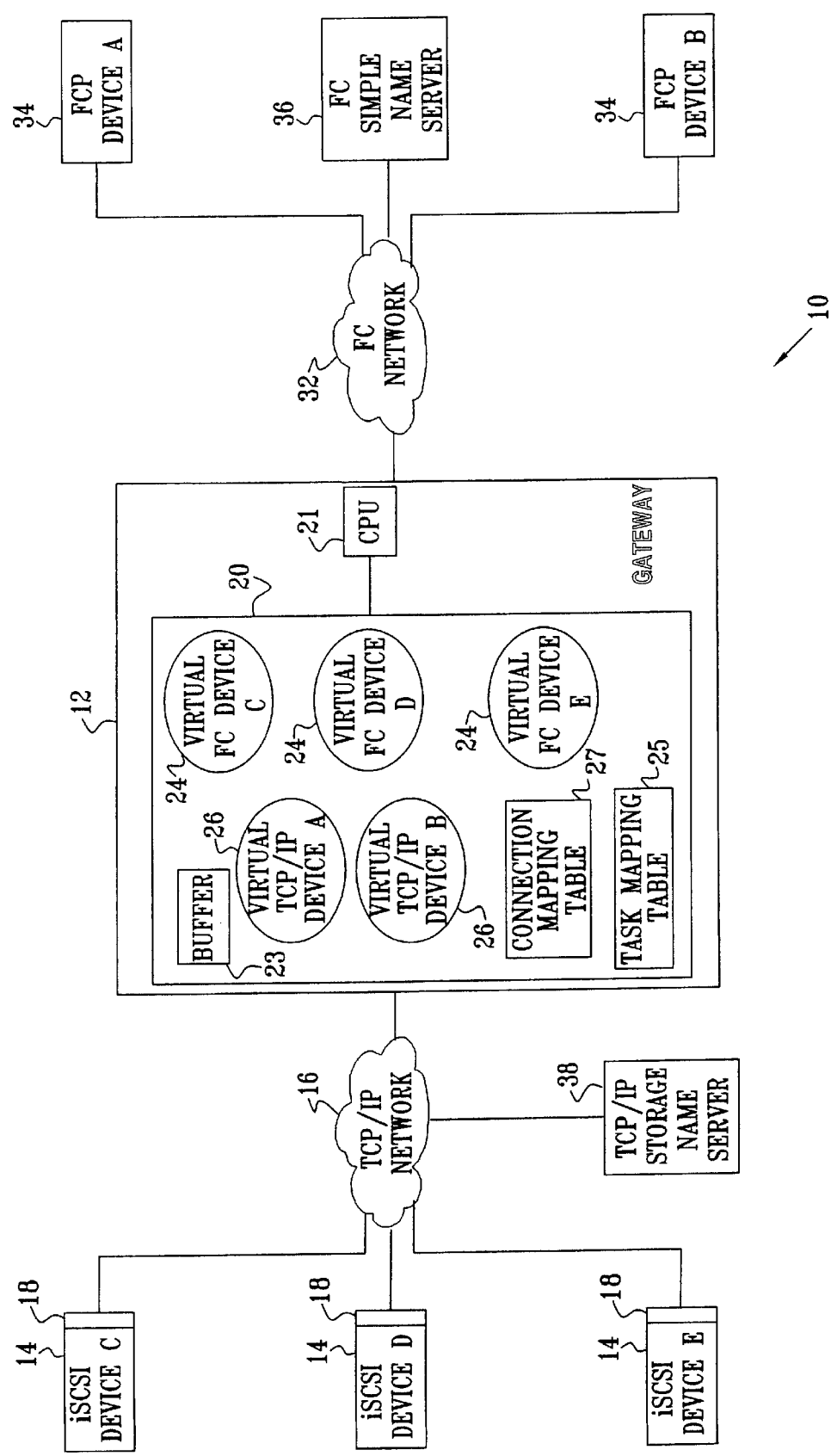
FIG. 1 which is a schematic diagram illustrating transferring data between an Internet Small Computer System Interface (iSCSI) device in a TCP/IP network and a Fibre Channel (FC) device operating as a SCSI device (FCP device) in an FC network.

Reference is now made to FIG. 1, which is a schematic diagram illustrating a system 10 for transferring data between an Internet Small Computer System Interface (iSCSI) device and a Fibre Channel (FC) device implemented to operate as a SCSI device (FCP device). A network 16 operating under a Transmission Control Protocol/Internet Protocol (TCP/IP) comprises one or more generally similar hosts 14, which may be any host which operates according to a SCSI protocol. At least one of hosts 14 is able to operate as an initiator of SCSI commands. At least one of hosts 14 is able to operate as a target of SCSI commands. The terms initiator and target are described in the Background of the Invention; typically, an initiator comprises a computer which uses a target, and a target comprises a storage drive, a printer, or any other input/output device. Each host 14, herein also termed iSCSI devices C, D, E, . . . , comprises a converter 18 which is able to convert SCSI data to iSCSI data, and vice versa. The SCSI data transfers between the converter and its host 14, and the iSCSI data transfers between the converter and TCP/IP network 16, so that the specific host is able to communicate with other entities within the network. Converters which operate as converter 18 are known in the art, and may take the form of software, hardware, or a combination of software and hardware. An example of such a converter is an 1000x1 iSCSI network interface card (NIC) produced by Alacritech Inc., of San Jose, Calif. As described in the Background of the Invention, transmitting SCSI data to and from SCSI devices in the form of iSCSI data enables the SCSI devices to function in network 16. Network 16 also comprises an IP name server 38, which preferably acts as a storage name server.

System 10 comprises a network 32 operating under a Fibre Channel (FC) protocol. FC network 32 comprises one or more SCSI devices 34, which may be any device which operates according to a SCSI protocol and which is able to receive and transmit SCSI data according to an FCP protocol, as described in the Background of the Invention. Devices 34 are herein also termed FCP device A, B, . . . . At least one device 34 is able to operate as an initiator of SCSI commands. At least one device 34 is able to operate as a target of SCSI commands. Network 32 preferably also comprises an FC Simple Name Server 36.

A gateway 12 couples FC network 32 to TCP/IP network 16, so as to transfer data between the networks. Preferably, gateway 12 acts as a switch within FC network 32, and comprises a gateway such as the GFS-8 gateway produced by SANCastle Technologies Inc, of San Jose, Calif. Gateway 12 comprises a central processing unit (CPU) 21 and a memory 20, the memory preferably also comprising one or more buffers 23 wherein data transferred between networks 12 and 32 is stored. Memory 20 also comprises a task mapping table 25 and a connection mapping table 27. Most preferably, at installation of gateway 12, the gateway identifies iSCSI hosts 14 operative in network 16, using Name Server 38. Alternatively, the gateway identifies iSCSI hosts 14 by any other means known in the art. For each iSCSI host 14 identified, CPU 21 assigns a virtual FC address in memory 20, so forming for each respective iSCSI host 14 a virtual FC "image" 24 that is "visible" to entities operating in network 32.

Similarly, most preferably at installation, gateway 12 identifies FCP devices 34 operative in network 32, using Name Server 36, or alternatively using any other means known in the art. For each FCP device 34 identified, CPU 21 assigns a virtual TCP/IP address in memory 20, so forming for each respective FCP device 34 a virtual TCP/IP image 26 that is "visible" to entities operating in network 16. Each virtual TCP/IP address is formed of a couple (IP address, TCP port) where the IP address corresponds to the IP address of the gateway, and where the TCP port is assigned by CPU 21 in conjunction with Name Server 38.

Thus, all SCSI enabled entities in both networks 16 and 32 are visible to each other, and each SCSI enabled entity in one of the networks is able to communicate with a SCSI enabled entity in the other network via gateway 12.

Figure 2:
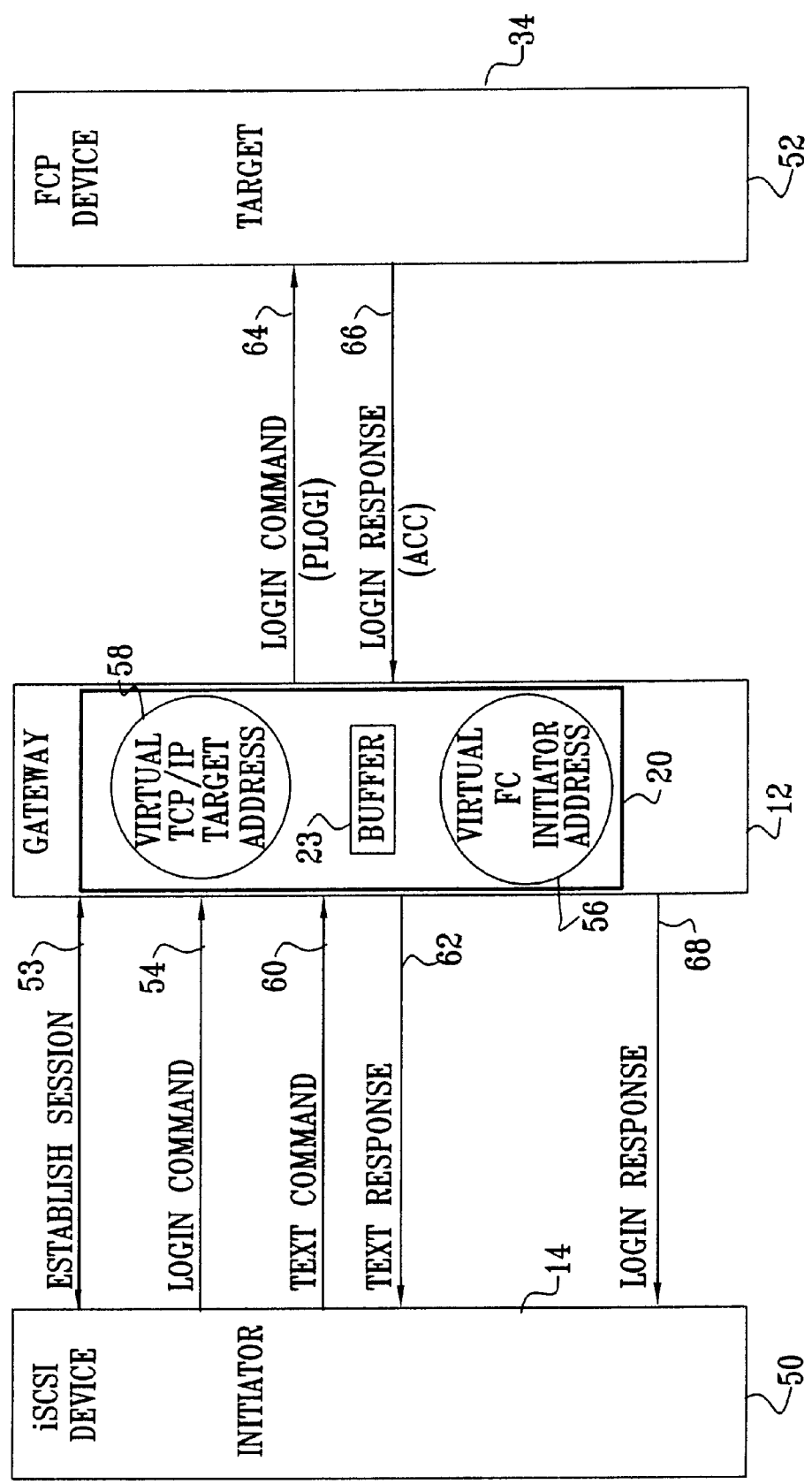
FIG. 2 is a diagram illustrating a session initiation process sequence of messages between an iSCSI initiator device and an FCP target device, according to a preferred embodiment of the present invention.

FIG. 2 is a diagram illustrating a session initiation process sequence of messages between an iSCSI device in network 16 and an FCP device in network 32, according to a preferred embodiment of the present invention. The sequence of messages occurs when a SCSI host 14 acts as an initiator 50, and an FCP device 34 acts as a target 52, for an initial login procedure between the initiator and the target. The initiator has a virtual FC address 56 in gateway 12, assigned as described above, so that the initiator appears, to FCP device 34, to "reside" in the gateway. The target has a TCP/IP couple address 58 in gateway 12, also assigned as described above, so that the target appears, to iSCSI device 14, also to reside in the gateway.

In a first, two-way, communication 53, a TCP/IP session between initiator 50 and virtual TCP/IP target address 58 is established. Then, in a second communication 54, initiator 50 sends a Login Command to target 52, using the target's virtual TCP/IP address 58. The Login Command requires target 52 to reply to initiator 50 before full communication between the two can be initiated. The reply comprises parameters of target 52, such as a type of target and/or specific factors within the SCSI protocol which are to be used in communicating with the target. In addition, initiator 50 may send some more parameters via a Text Command communication 60. Gateway 12 responds to any communication 60 by sending a Text Response 62 to initiator 50. Initiator 50 then waits for a Login Response. In a communication 64, gateway 12 sends a login command to target 52, using the parameters in communication 54 and communication 60, the login command being addressed from virtual address 56. Target 52 responds to communication 64 with a login response 66 to virtual address 56, the response being received by gateway 12. The combination of login command 64 and response 66 generate an FC connection between gateway 12 and target 52.

In a final Login Response communication 68, the gateway sends initiator 50 a reply to communication 54, using parameters from response 66, thus completing the initial login procedure. The login procedure generates a "connection-pair" between initiator 50 and target 52, the connection-pair comprising a TCP connection (between the initiator and the gateway) and an FC connection (between the gateway and the target). The connection-pair is stored as a mapping within connection mapping table 27, for the duration of the connection.

It will be understood that while the process described hereinabove with reference to FIG. 2 applies to the login procedure for an initiator in network 16 and a target in network 32, a substantially similar process applies for an initial login procedure for an initiator in network 32 and a target in network 16. In the latter case the login procedure generates a connection-pair comprising an FC connection (between the initiator and the gateway) and a TCP connection (between the gateway and the target).

Figure 3:
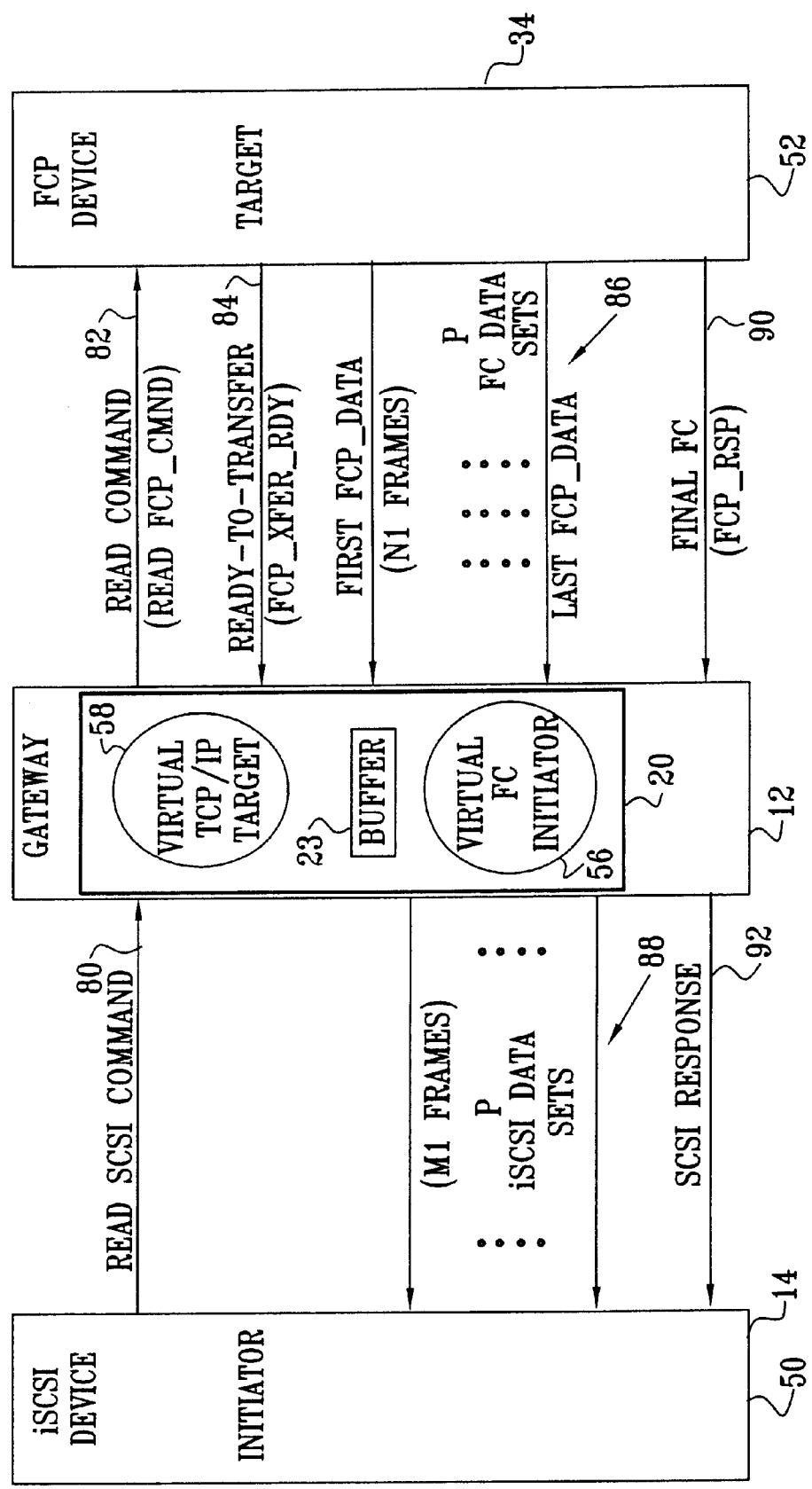
FIG. 3 is a diagram illustrating a sequence of messages occurring between the iSCSI initiator device and the FCP target device of FIG. 2, when the initiator reads from the target, according to a preferred embodiment of the present invention.

FIG. 3 is a diagram illustrating a sequence of messages occurring between initiator 50 and target 52, according to a preferred embodiment of the present invention. The sequence applies when initiator 50 reads data from target 52. In a first message 80, initiator 50 transmits a read command, in an iSCSI format, to virtual address 58 of target 52. The message is received by gateway 12, which generates a new FCP task for this read command, and establishes a mapping between an iSCSI task identity and an FCP task identity (FC OXID) in mapping table 25. The gateway converts the read command to a translated read command 82, compatible with the FCP protocol, addressed to target 52 from initiator virtual address 56. The translation includes translating the SCSI read task identity to the corresponding FCP read task identity (FC OXID), and gateway 12 transmits the translated read command to target 52. In reply, target 52 transmits a "ready-to-transfer" response 84 to virtual. address 56. The response is received at gateway 12, but the gateway takes no action with respect to the response. Target 52 then transmits data in the form of sets of data 86, consisting of P separate sets of data frames to virtual address 56. Each set comprises a number N1, N2, . . . of data frames which target 52 transmits. When target 52 completes sending the P sets of data frames, it sends a final communication FCP_RSP 90 to initiator virtual address 56, completing the read sequence of commands from the point of view of the target.

Gateway 12 collects each FCP set of frames 86 into one message preferably in buffer 23, and translates the message into an iSCSI data message, using the established mapping between the FCP task identity and the iSCSI task identity. The gateway then sends the message from virtual TCP/IP target 58 to iSCSI initiator 50, via TCP, by breaking it into several TCP/IP frames 88. Gateway 12 thus sends P sets of TCP/IP frames, each set comprising a number M1, M2, . . . of frames. In general, N1, N2, . . . are respectively different from M1, M2, . . . .

When gateway 12 receives final communication FCP_RSP 90, it translates it into an iSCSI Response message 92, and sends the message to initiator 50. Gateway 12 then removes the iSCSI task/FCP task mapping from its mapping table 25.

Figure 4:
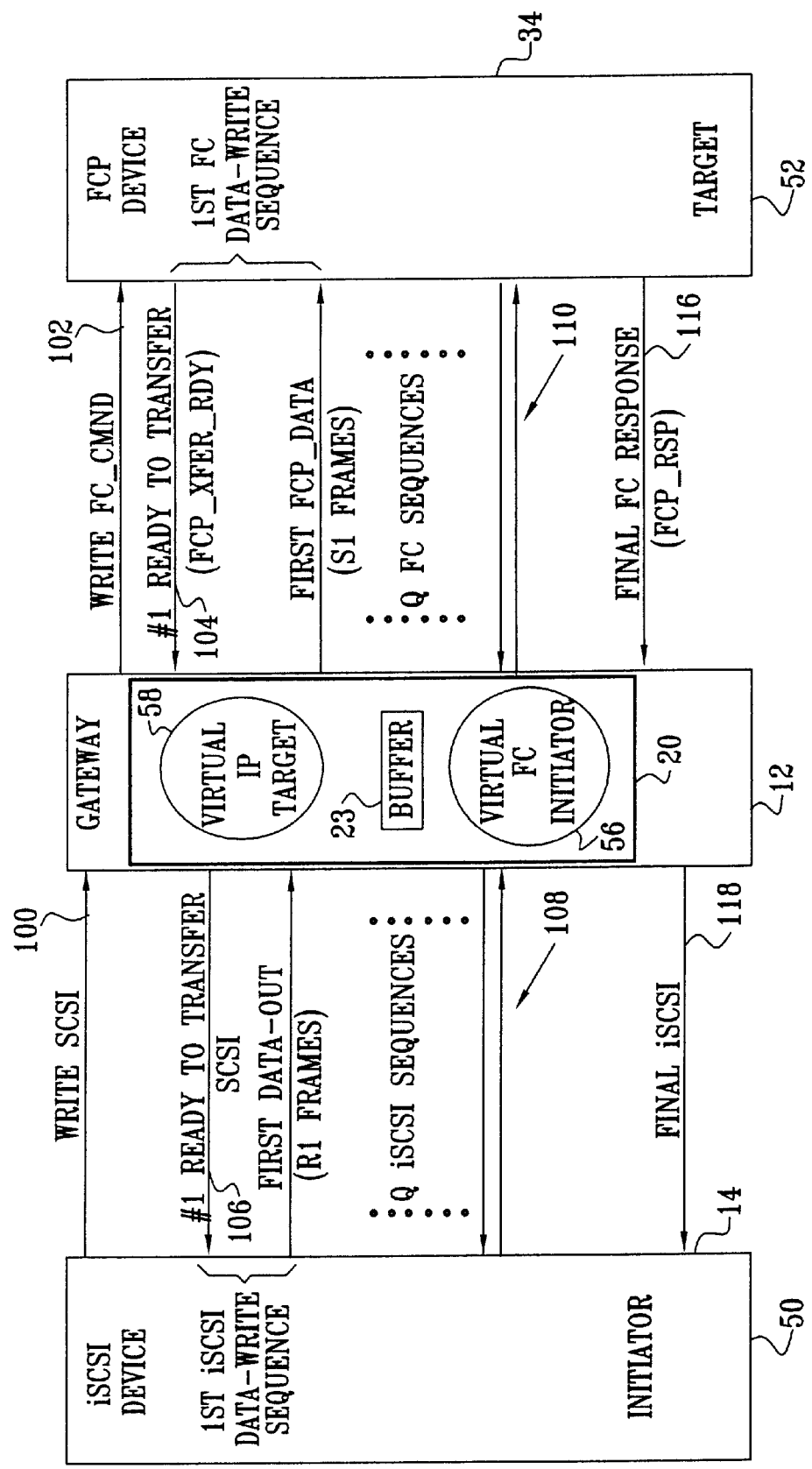
FIG. 4 is a diagram illustrating a sequence of messages occurring between the initiator and the target of FIG. 2, when the initiator writes to the target, according to a preferred embodiment of the present invention.

FIG. 4 is a diagram illustrating a sequence of messages occurring between initiator 50 and target 52, according to a preferred embodiment of the present invention. The sequence applies when initiator 50 writes data to target 52. In a first message 100, initiator 50 transmits a write command, in an iSCSI format, to virtual address 58 of target 52. The message is received by gateway 12, which generates a new FCP task for this write command, and establishes a mapping between the iSCSI task identity and the FCP task identity (FC OXID) in mapping table 25. The gateway converts the write command to a translated write command 102. The write command is compatible with the FCP protocol and is addressed to target 52 from initiator virtual address 56. Gateway 12 then transmits translated write command 102 to target 52. In reply, target 52 transmits a first FC ready-to-transfer message 104 to virtual address 56. Gateway 12 translates message 104 to a first iSCSI ready-to-transfer 106, and transmits message 106 to initiator 50, causing the initiator to start transmitting Q sets 108 of iSCSI data-out messages to the gateway. Each set comprises a number R1, R2, . . . of data frames which initiator 50 transmits. As described in more detail below, as each set of data-frames is transmitted, initiator 50 waits for a response before continuing.

Gateway 12 collects each iSCSI set of data message frames 108 into one message, and translates it into an FCP sequence, using the established mapping between the FCP task identity and the iSCSI task identity. The gateway then sends the message from virtual FC initiator 56 to iSCSI initiator 50, via FC, by breaking it into several FC frames 110. Gateway 12 sends Q sets of FC frames, each set comprising a number S1, S2, . . . of frames, substantially as described above. In general, R1, R2, . . . . are respectively different from S1, S2, . . . .

When gateway 12 receives a final communication FCP_RSP 116, it translates it into an iSCSI Response message 118, and sends the message to initiator 50. Gateway 12 then removes the iSCSI task/FCP task mapping from its mapping table 25.

Sequences of instructions described above with reference to FIGS. 3 and 4 have assumed that the initiator of the sequence is an iSCSI device, and the target of the sequence is an FCP device. It will be appreciated that generally similar sets of sequences, mutatis mutandis, apply when the initiator is an FCP device and the target is an iSCSI device.

In preferred embodiments of the present invention, gateway 12 is implemented to perform a synchronization check on iSCSI frames received while a connection-pair connecting an initiator and target is operative. As is known in the art, synchronization is checked at the TCP level, but there are cases where a damaged frame may not be detected at this level, for example, a TCP checksum may be valid, but there may be undetected error bits. Preferably, in the event of discovering a synchronization error, gateway 12 resynchronizes subsequent frames and allows missing frames to be recovered at a higher level, corresponding to an application being implemented. Alternatively, gateway 12 is implemented to close the connection-pair, and allow the application to reopen it.

It will be appreciated that the preferred embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

What is claimed is:

1. A method for transferring information between an Internet Small Computer System Interface (iSCSI) device operating under an iSCSI protocol within a Transmission Control Protocol/Internet Protocol (TCP/IP) network and a SCSI over Fibre Channel (FCP) device operating under an FCP protocol within a Fibre Channel (FC) network, comprising:

coupling the TCP/IP and the FC networks via a gateway adapted to convey data between the networks;

generating in the gateway a virtual-FC-address compatible with the FC protocol for the iSCSI device;

generating in the gateway a virtual-TCP/IP-address compatible with the TCP/IP protocol for the FCP device;

conveying a first FC-data-frame, compatible with the FCP protocol and comprising FCP-data, from the FCP device addressed to the virtual-FC-address of the iSCSI device;

translating in the gateway the first FCP-data-frame into a first iSCSI-data-frame, compatible with the iSCSI protocol and comprising the FCP-data, addressed to a TCP/IP address of the iSCSI device;

conveying the first iSCSI-data-frame from the gateway to the iSCSI device responsive to the TCP/IP address;

conveying a second iSCSI-data-frame, compatible with the iSCSI protocol and comprising iSCSI-data, from the iSCSI device addressed to the virtual-TCP/IP-address of the FCP device;

translating in the gateway the second iSCSI-data-frame into a second FCP-data-frame, compatible with the FCP protocol and comprising the iSCSI-data, addressed to an FC address of the FCP device; and conveying the second FCP-data-frame from the gateway to the FCP device responsive to the FC address.

2. A method according to claim 1, wherein the FCP-data comprises a task for the iSCSI device, and wherein translating the first FCP-data-frame comprises mapping the task to an iSCSI task.

3. A method according to claim 1, wherein the iSCSI-data comprises a task for the FCP device, and wherein translating the second iSCSI-data-frame comprises mapping the task to an FC task.

4. A method according to claim 1, wherein translating in the gateway the second iSCSI-data-frame comprises performing a synchronization check on the second iSCSI-data-frame.

5. A method according to claim 4, and comprising re-synchronizing a subsequent iSCSI-data-frame responsive to the synchronization check.

6. A method according to claim 1, and comprising generating a connection-pair between the iSCSI device and the FCP device, wherein the connection-pair comprises a TCP connection between the iSCSI device and the gateway which is mapped to an FC connection between the gateway and the FCP device.

7. Apparatus for transferring information between an Internet Small Computer System Interface (iSCSI) device operating under an iSCSI protocol within a Transmission Control Protocol/Internet Protocol (TCP/IP) network and a SCSI over Fibre Channel (FCP) device operating under an FCP protocol within a Fibre Channel FC network, comprising:

a gateway, comprising a central processing unit (CPU) and a memory, wherein the gateway couples the TCP/IP and the FC networks and is adapted to convey data between the networks, wherein the CPU:

generates in the memory a virtual-FC-address compatible with the FC protocol for the iSCSI device; and generates in the memory a virtual-TCP/IP-address compatible with the TCP/IP protocol for the FCP device;

and wherein the gateway is adapted to:

receive a first FCP-data-frame, compatible with the FCP protocol and comprising FCP-data, from the FCP device addressed to the virtual-FC-address of the iSCSI device;

translate the first FCP-data-frame into a first iSCSI-data-frame, compatible with the iSCSI protocol and comprising the FCP-data, addressed to a TCP/IP address of the iSCSI device;

convey the first iSCSI-data-frame from the gateway to the iSCSI device responsive to the TCP/IP address;

receive a second iSCSI-data-frame, compatible with the iSCSI protocol and comprising iSCSI-data, from the iSCSI device addressed to the virtual-TCP/IP-address of the FCP device;

translate the second iSCSI-data-frame into a second FCP-data-frame, compatible with the FCP protocol and comprising the iSCSI-data, addressed to an FC address of the FCP device; and convey the second FCP-data-frame from the gateway to the FCP device responsive to the FC address.

8. Apparatus according to claim 7, wherein the FCP-data comprises a task for the iSCSI device, and wherein the CPU maps the task to an iSCSI task.

9. Apparatus according to claim 7, wherein the iSCSI-data comprises a task for the FCP device, and wherein the gateway maps the task to an FCP task.

10. Apparatus according to claim 7, and wherein the gateway is adapted to perform a synchronization check on the second iSCSI-data-frame.

11. Apparatus according to claim 10, wherein the gateway is adapted to resynchronize a subsequent iSCSI-data-frame responsive to the synchronization check.

12. Apparatus according to claim 7, wherein the CPU is adapted to generate a connection-pair between the iSCSI device and the FCP device, wherein the connection-pair comprises a TCP connection between the iSCSI device and the gateway which is mapped to an FC connection between the gateway and the FCP device.

\* \* \* \* \*